United States Patent [19]
Rich

[11] 3,912,290
[45] Oct. 14, 1975

[54] COLLAPSIBLE SLED

[76] Inventor: Robert S. Rich, 123 Crest Ave., Lancaster, Pa. 17602

[22] Filed: June 3, 1974

[21] Appl. No.: 476,160

[52] U.S. Cl. .......................... 280/9; 280/19; 280/20
[51] Int. Cl.² ........................................ B62B 13/18
[58] Field of Search ........... 280/8, 9, 20, 28, 30, 32, 280/19; 224/9 R

[56] References Cited
UNITED STATES PATENTS

| | | | |
|---|---|---|---|
| 1,349,311 | 8/1920 | Asman | 280/8 |
| 2,541,327 | 2/1951 | Billinghurst | 280/8 UX |
| 2,673,744 | 3/1954 | Johnson | 280/20 |
| 3,022,086 | 2/1962 | Allen | 280/30 |
| 3,693,849 | 9/1972 | Knabenbauer | 280/20 X |
| 3,799,566 | 3/1974 | Thompson | 280/20 X |

*Primary Examiner*—David Schonberg
*Assistant Examiner*—Michael J. Forman
*Attorney, Agent, or Firm*—Clarence A. O'Brien; Harvey B. Jacobson

[57] ABSTRACT

A plurality of end aligned elongated sled sections are pivotally secured together at their adjacent ends for relative angular displacement about horizontal transverse axes between first operative positions with the sections in end aligned position and second relatively folded positions with the sled sections disposed in vertically stacked relation. Suitable structure is provided for releasably securing the sled sections in their operative positions and the sled sections include opposite side runner structures which, when the sled sections are in their operative positions, coact to form opposite side elongated runner assemblies extending the full length of the sled construction. The front and rear ends of the sled construction include opposite side vertically spaced support wheel mounting structures and opposite side wheel assemblies are provided for the front and rear ends of the sled construction, with each wheel assembly being selectively supportable from the corresponding vertically spaced wheel mounting structures. When the wheel assemblies are mounted from the lower set of wheel mounting structures, the lower peripheral portions of the wheel assemblies project considerably below the runner assemblies of the sled construction and when the wheel assemblies are supported from the upper set of wheel mounting structures, the lower peripheral portions of the wheel assemblies are spaced above the under surface portions of the runner assemblies. Also, the lower wheel mounting structures at the forward end of the sled are defined on opposite ends of an axle member extending transversely of the front sled section and having its mid-portion supported from the front sled section for oscillation about a vertical axis, the axle being disposed in a horizontal plane spaced above the runner assemblies.

8 Claims, 10 Drawing Figures

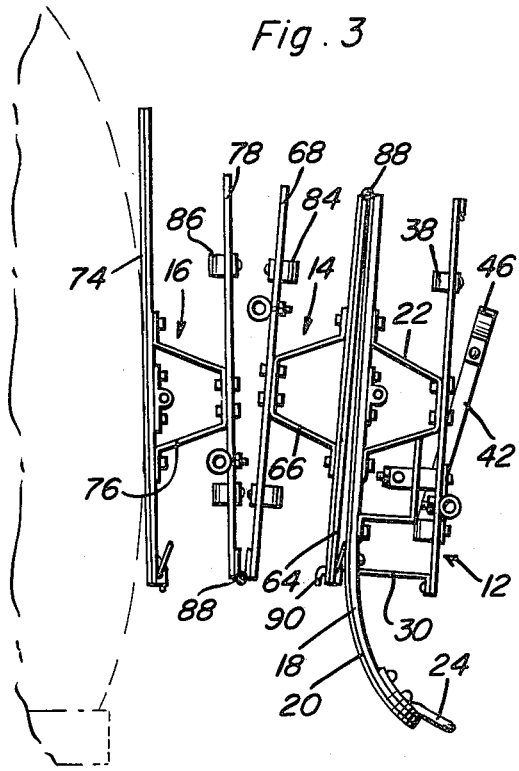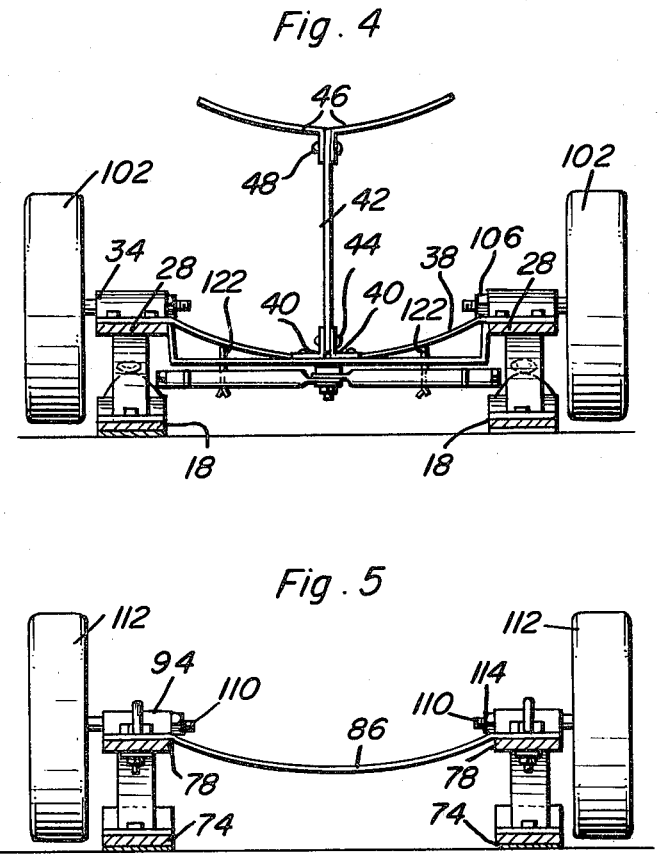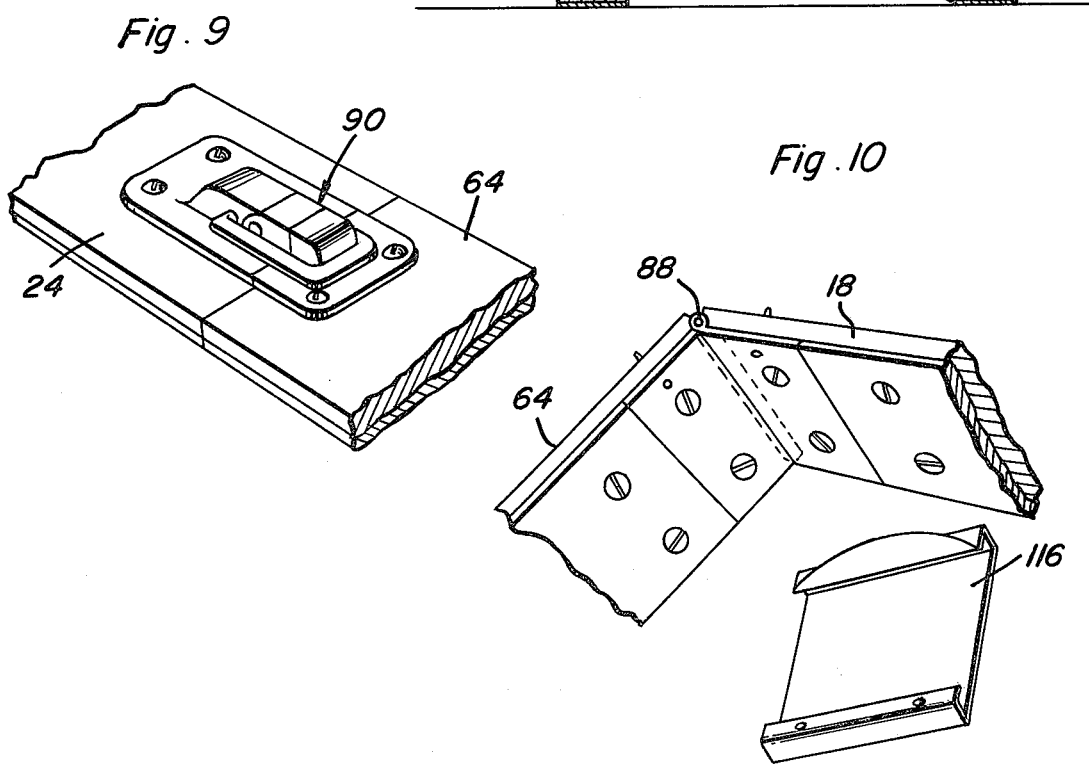

COLLAPSIBLE SLED

BACKGROUND OF THE INVENTION

The collapsible sled of the instant invention has been primarily designed for use by hunters to assist in hauling killed game from the point of kill back to the hunters' transportation vehicle.

Various types of collapsible and convertible sleds have been heretofrore designed, examples of such prior art being disclosed in U.S. Pat. Nos. 1,123,676, to E. R. Bule, dated Jan. 5, 1915, 1,380,660, to L. Leicht, dated June 7, 1921, 1,409,501, to E. D. Volz, dated Mar. 14, 1922, 2,343,662, to L. V. Goff, dated Mar. 7, 1944, 2,472,920, to R. G. Peenstra, dated June 14, 1949, 2,667,996, to J. A. Fanelli, dated Feb. 2, 1954, 3,158,299, to D. G. Weir et al, dated Nov. 24, 1964, and 3,693,849, to Melvin K. Knabenbauer, dated Sept. 26, 1972.

While convertible sleds have been heretofore designed and foldable sleds have also heretofore been designed, the collapsible sled of the instant invention has both the convertible feature and the collapsible feature. Its convertible feature enables it to be readily pulled over snow surfaces as well as rolled over hard ground surfaces and its collapsible feature enables the sled to be readily packed into a hunting area by a hunter on foot.

BRIEF DESCRIPTION OF THE INVENTION

The sled of the instant invention has been designed with the hunter in mind. It is compact and easy to carry and folds to a size which may be easily carried on a hunter's back. The weight of the sled is minimal inasmuch as its construction is primarily of lightweight metal, such as aluminum, and the cross bars or braces extending between the opposite side runner sections of each sled section are upwardly concave whereby a killed animal may be at least partially cradled in the sled when the latter is in use.

The main object of this invention is to provide a sled construction which may be both folded into a compact state and converted for movement over hard ground surfaces.

Another object of this invention is to provide a construction which is light in weight and yet sufficiently strong to support several hundred pounds while the sled is being moved over snow covered or hard ground surfaces.

Still another object of this invention is to provide a sled which may be converted so as to be provided with front and rear pairs of opposite side ground engaging support wheels with the front support wheels being steerable.

A final object of this invention to be specifically enumerated herein is to provide a sled construction in accordance with the preceding objects and which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational view of the sled in a collapsed position and with the wheels removed and the sled sections vertically disposed in position to be carried on the back of a hunter;

FIG. 4 is a fragmentary transverse vertical sectional view taken substantially upon the plane indicated by the section line 4—4 of FIG. 1;

FIG. 5 is a transverse sectional view taken substantially upon the plane indicated by the section line 5—5 of FIG. 1;

FIG. 9 is a fragmentary perspective view illustrating the manner in which the adjacent ends of one pair of runner members of adjacent sled sections are releasably anchored together in the operative positions; and FIG. 10 is a fragmentary perspective view illustrating the manner in which the adjacent ends of another pair of runner members of an adjacent pair of sled sections are pivotally secured together and also illustrating a removable hinge protective clip illustrated in exploded position.

DETAILED DESCRIPTION OF THE INVENTION

Figure 1:
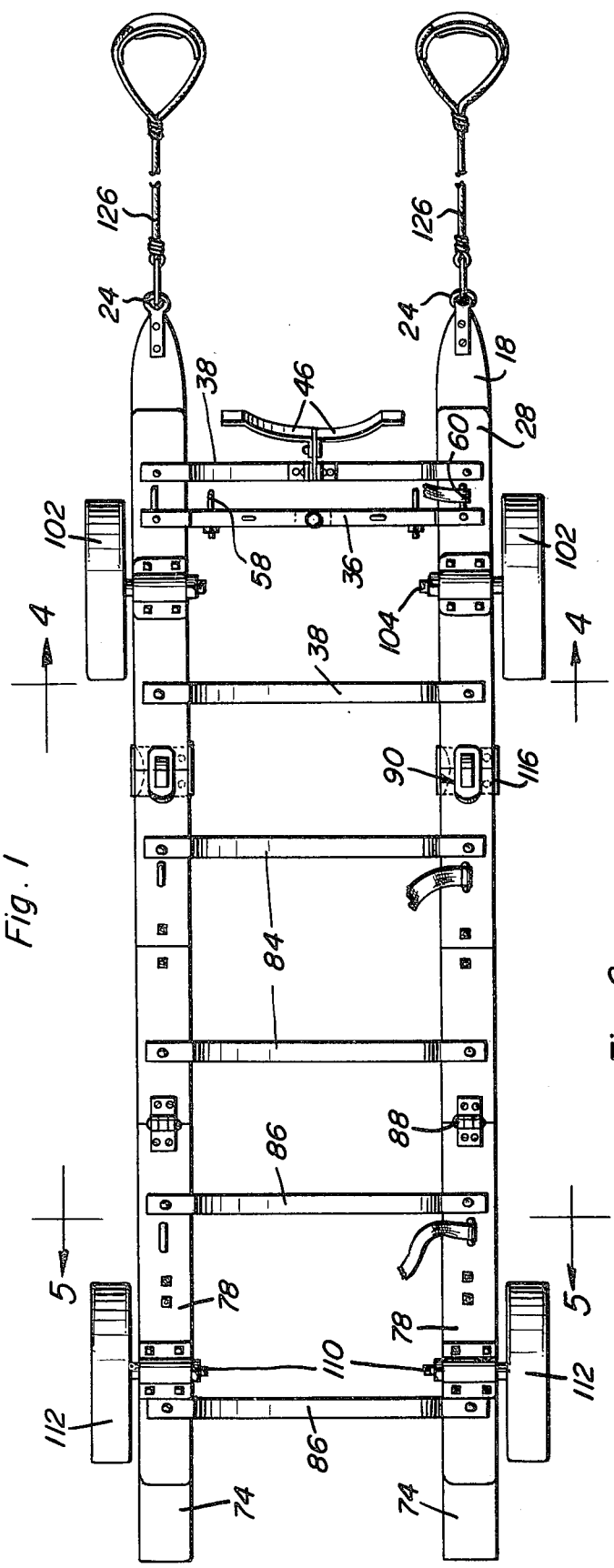
FIG. 1 is a top plan view of the sled in an extended operative position and with the wheels thereof supported from their upper mounts so as to adapt the sled to be pulled over snow covered ground surfaces.

Referring now more specifically to the drawings, the numeral 10 generally designates the collapsible sled of the instant invention. The sled 10 includes three elongated sled sections, including a front sled section referred to in general by the reference numeral 12, an intermediate sled section referred to in general by the reference numeral 14 and a rear sled section referred to in general by the reference numberal 16.

The front sled section 12 includes a pair of opposite side longitudinally extending runner or ski members 18 whose forward ends curve upwardly as at 20. Each of the ski members 18 includes an upstanding support bracket 22 supported therefrom intermediate its opposite ends and the forward upwardly curving ends 20 of the ski member 18 include anchor eyes 24. The sled section 12 also includes a pair of upper longitudinal opposite side bars 28 whose mid-portions are supported from the upper ends of the support brackets 22. Further, a pair of upstanding supports 30 are secured between the forward ends of the bars 28 and the underlying portions of the ski members 18. Still further, an inverted L-shaped brace 32 is secured between the forward portion of each support bracket 22 and the corresponding ski members 18 at a point spaced forward of the corresponding support bracket 22.

A pair of journaled brackets 34 are secured to the upper surface of the mid-portions of the bars 28 for a reason to be hereinafter more fully set forth a shallow U-shaped cross member 36 is secured between the forward ends of the bars 28. Also, a pair of front and rear transverse braces 38 are secured between corresponding front and rear portions of the bars 28 rigidly interconnecting the latter, the braces 38 opening upwardly. The forward brace 38 has a pair of spaced L-shaped mounting brackets 40 secured thereto and the lower end of an upstanding support arm 42 is pivotally supported between the braces 40 as at 44. The upper end of the support arm 42 has a pair of cradle defining arms 46 secured thereto as at 48.

The mid-portion of the cross member 36 has an upstanding pivot bolt 50 secured therethrough and the mid-portion 52 of a transverse horizontal axle 54 is oscillatably supported from the pivot bolt 50. The opposite ends of the axle 54 include threaded aligned bores 56 and the forward sides of the opposite ends of the axle 54 include forwardly projecting eyes 58. Still further, the forward end portions of the bars 28 include upwardly projecting anchor eyes 60 to which strap members 62 are secured.

The sled section 14 includes a pair of lower ski members 64 corresponding to the ski members 18 and the ski members 64 include upstanding support brackets 66 corresponding to the support brackets 22. Also, a pair of bars 68 corresponding to the bars 28 are secured to the upper portions of the support brackets 66 and the forward end portions of the bars 68 include upwardly projecting anchor eyes 70 to which straps 72 corresponding to the straps 62 are secured.

The rear sled section 16 includes a pair of ski members 74 corresponding to the ski members 64 and each of the ski members 74 includes an upstanding support bracket 76 corresponding to the support brackets 66. Further, a pair of upper longitudinally extending opposite side bars 78 corresponding to the bars 68 are secured to the upper portions of the support brackets 76 and the forward ends of the bars 78 include upwardly projecting anchor eyes 80 to which strap members 82 are attached. Also, the sled sections 14 and 16 include transverse braces 84 and 86, respectively, corresponding to the transverse braces 38.

Figure 2:
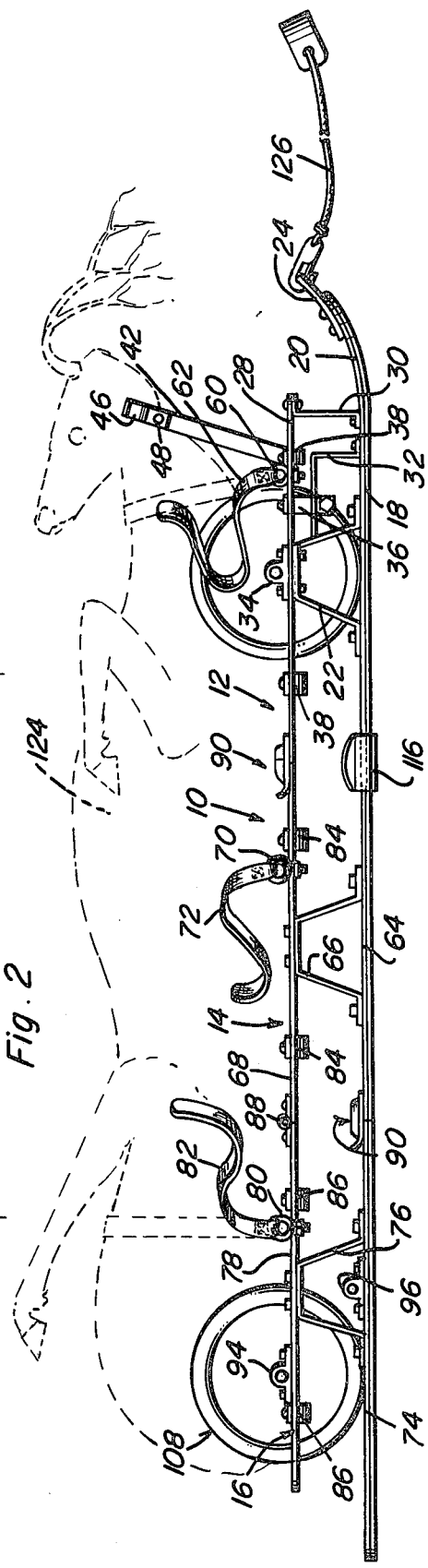
FIG. 2 is a side elevational view of the sled.
Figure 6:
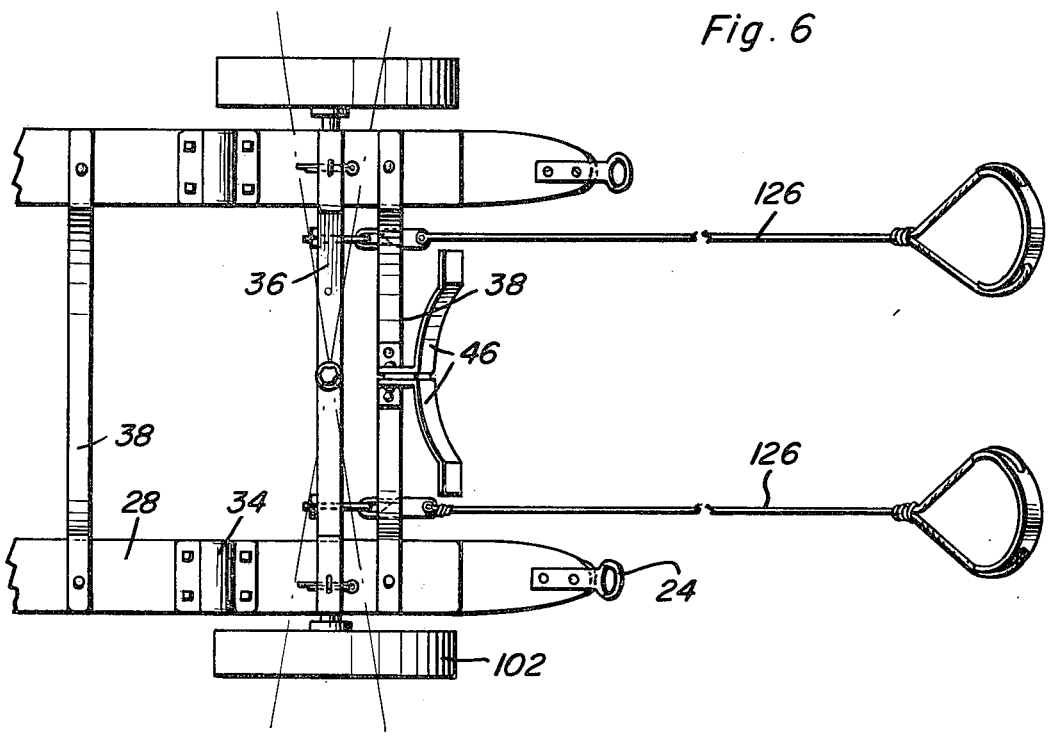
FIG. 6 is a fragmentary top plan view of the forward end of the sled with the forward support wheels in their lower mounted operative positions.
Figure 7:
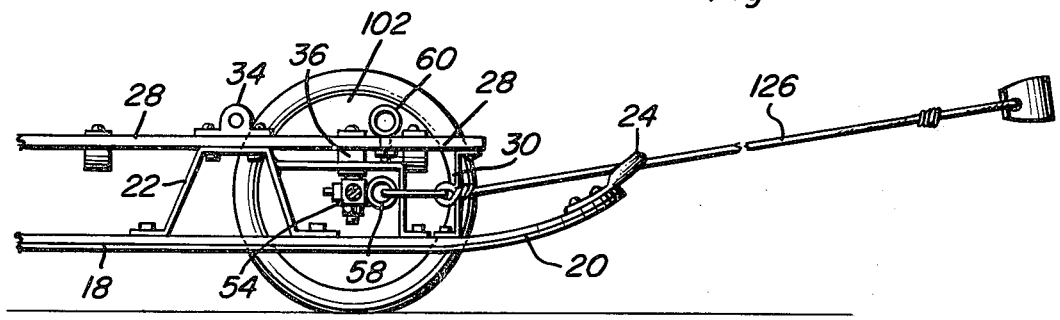
FIG. 7 is a side elevational view of the assemblage illustrated in FIG. 6 and with the near side wheel removed and the supporting axle portion illustrated in vertical section.

As can best be seen from FIG. 10 of the drawings, front and rear ends of the ski members 64 and 18 are pivotally secured together by means of hinge assemblies 88 and from FIG. 9 of the drawings, it may be seen that the front and rear ends of corresponding ski members 74 and 64 are removably anchored together by means of releasable toggle latch assemblies 90. Still further, the front and rear ends of the bars 68 and 28 are removably anchored together by means of toggle latch assemblies 90 and the front and rear ends of the bars 78 and 68 are pivotally interconnected by means of a second pair of hinges or hinge assemblies 88. Thus, it will be readily appreciated that the sled sections 12, 14 and 16 may be secured together in end aligned relation such as that illustrated in FIGS. 1 and 2 of the drawings and that the latch assemblies 90 may be released in order to enable the sled sections 12, 14 and 16 to be folded relative to each other for ease in carrying upon the back of a hunter, see FIG. 3.

In addition to the journaled blocks 34 the axle 54, the rear sled section includes a pair of upper journaled blocks 94 corresponding to the journaled blocks 34 and also a pair of lower journaled blocks 96 supported from the mid-portions of the ski members 74.

Figure 8:
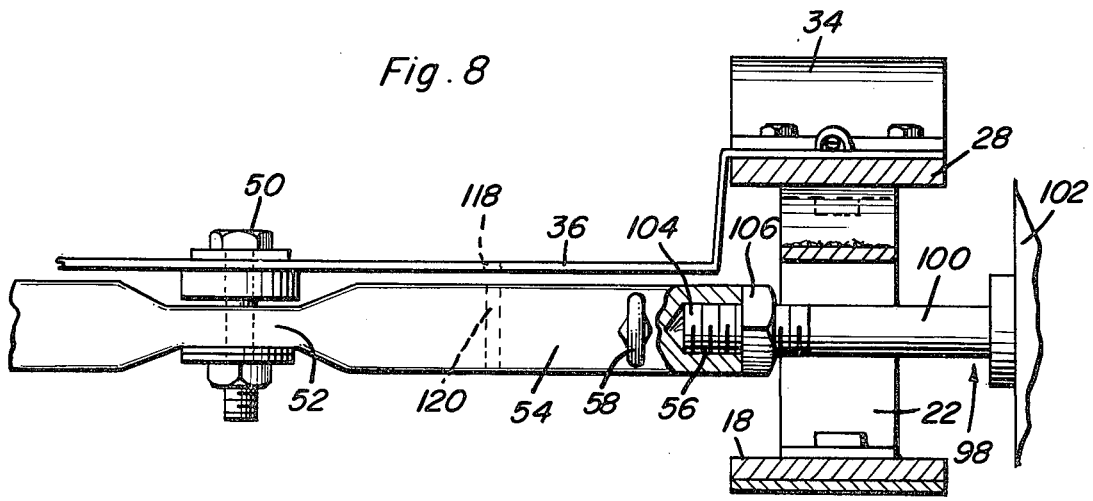
FIG. 8 is a fragmentary sectional view illustrating the manner in which the forward left hand support wheel is supported in the lower operative position.

With attention now invited more specifically to FIG. 8 of the drawings, there may be seen one of the two front wheel assemblies referred to in general by the reference numerals 98 including stub axles 100 upon which wheels 102 are journaled at one pair of corresponding ends. The other ends of the stub axle 100 are threaded at 104 and have combination jamb and thrust nuts 106 threadedly engaged thereon. When it is desired to have the front wheels 102 supported from the opposite ends of the axle 54, the threaded end of each shank portion or stub axle 100 is threaded into the corresponding bore 56 and the jamb nuts 106 are tightened. However, when it is desired to support the front wheels 102 in elevated position relative to the under surface portions of the ski members 18, the stub axles 100 are removed from the corresponding ends of the axle 54 and the nuts 106 are removed. Then, the stub axles 100 are secured through the journaled blocks 34 by means of the nuts 106 which then comprise thrust nuts.

Additionally, a pair of rear wheel assemblies 108 are provided and include stub axles 110 corresponding to the stub axles 100, wheels 112 corresponding to the wheels 102 and thrust nuts 114 corresponding to the nuts 106. Of course, when the rear wheels 112 are to be supported in their lower operative positions, the stub axles 110 are secured through the lower journaled blocks 96 by the nuts 114 and when the wheels 112 are to be supported in the raised inoperative positions, the stub axles 100 are secured through the upper journaled blocks 94 by means of the nuts 114.

The lower hinge assemblies 88 may be removably covered by means of C-shaped protective clips such as the clip 116 illustrated in the lower portion of FIG. 10. Each clip 116 is constructed of spring metal or plastic and may be clipped over the lower portion of the corresponding hinge assembly and the opposite sides of the ski members 18 and 64 when the latter are disposed in end aligned relation. Further, from FIG. 8 of the drawings, it may be seen that the opposite ends of the cross member 36 are provided with upstanding bores 118 registrable with corresponding upstanding bores 120 formed in the opposite end portions of the axle 54 and when the axle 54 is not being used, removable pins 122 may be secured through each set of registered bores 118 and 120, see FIG. 4.

In operation, when it is desired to utilize the sled construction 10 on a snow covered surface, the wheels 102 and 112 are supported in their raised inoperative positions as heretofore set forth. A killed animal, such as that indicated by the reference numeral 124 in FIG. 2 of the drawings, may be cradled on the transverse braces 38, 84 and 86 and strapped in position on the sled construction 10 after the sections 12, 14 and 16 have been arranged in end to end relation and locked into position by means of the latches 90. Then, a pair of pull members 126 are removably secured to the eyes 24 at the forward ends of the ski members 18. The neck or head of the animal 124 is cradled in the cradle defining arms 46 and the animal may thus be readily transported over a snow covered surface. On the other hand, should it be desired to move the sled 10 over hard ground surfaces, the rear wheels 112 are supported in their lower positions and the front wheels 102 are supported from the opposite ends of the axle 54. The pins 122 are removed and the pull members 126 are disengaged from the eyes 24 and are snap-engaged with the forwardly projecting eye members 58 on the opposite ends of the axle 54. In this mode, the sled 10 may be readily rolled over hard ground surfaces.

When the sled is not in use, the wheels 102 and 112 may be removed and the latch assemblies 90 may be released so that the sled may have its various sections 12, 14 and 16 pivoted relative to each other in the manner illustrated in FIG. 3 of the drawings. As thus positioned, the sled 10 may be readily carried on the back of a hunter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A sled construction including three end aligned elongated sled sections pivotally secured together at their adjacent ends for relative angular displacement about a horizontal transverse axis between first operative positions with said sections in end aligned position and second relatively folded positions with said sled sections disposed in vertically stacked relation, said sled sections each including a pair of lower opposite side longitudinally extending runner members, the central portions of the opposite end sections of said sled construction including opposite side support wheel means, said support wheel means and said end sections including coacting means for selectively supporting said wheel means in the upper and lower positions with the lower peripheral portions of said wheel means spaced above and below, respectively, the lower under surface portions of said runner members, said sled sections each including a pair of opposite side longitudinal bar members spaced above and supported from the corresponding runner members with bar members on each side of the sled disposed in opposing end-to-end relation when said sled sections are disposed in end aligned positions, said sled sections each including a plurality of upwardly concave arcuate braces extending and secured between corresponding longitudinally spaced portions of the corresponding bar members, said sled construction including front, intermediate and rear sled sections, the front ends of one pair of members of said intermediate sled sections being pivotally supported from the adjacent ends of the corresponding members of the adjacent sled section and the rear ends of the other pair of members of said intermediate sled section and the adjacent ends of the corresponding members of the adjacent sled section being pivotally supported from the adjacent ends of the corresponding members of the adjacent sled section.

2. The combination of claim 1 wherein said coacting means for selectively supporting the wheel means on one end sled section in upper and lower positions includes a transverse axle member oscillatably supported from said one end sled section for oscillation about a vertical axis with said axle spaced above the lower under surfaces of said one end sled section and means for removably journalling the corresponding wheel means from the opposite ends of said axle, said mounting means including threaded blind bores in the ends of said axle member and a pair of stub axles including one pair of corresponding ends removably threaded in said blind bores, said wheel means being journalled on the other pair of corresponding ends of said stub axles.

3. The combination of claim 1 including coacting latch means releasably securing the rear ends of said one pair of members of said intermediate sled section and the adjacent ends of the corresponding members of the adjacent sled section together and the front ends of the other pair of members of said intermediate sled section and the adjacent ends of the corresponding members of the adjacent sled section together.

4. The combination of claim 3 wherein said one pair of members of said intermediate sled section comprise the runner members thereof.

5. The combination of claim 1 wherein said coacting means for selectively supporting the wheel means on one end sled section in upper and lower positions includes a transverse axle member oscillatably supported from said one end sled section for oscillation about a vertical axis with said axle spaced above the lower under surfaces of said one end sled section and mounting means for removably journalling the corresponding wheel means from the opposite ends of said axle member, said one sled section wheel means being disposed in the lower positions thereof when journalled from said axle member, said mounting means and one sled section including means operative to removably rotatably support the wheel means of said first sled section from the latter about fixed horizontal transverse axes with the last-mentioned wheel means in the upper positions and the lower peripheral portions thereof spaced outwardly of and only slightly above the corresponding lower under surface portions.

6. The combination of claim 5 wherein said mounting means includes threaded blind bores in the ends of said axle member and a pair of stub axles including one pair of corresponding ends removably threaded in said blind bores, said wheel means being journalled on the other pair of corresponding ends of said stub axles.

7. The combination of claim 6 wherein the opposite ends of said axle are spaced inwardly of the opposite sides of said one end sled section and said other pair of ends of said stub axles are disposed outwardly of the opposite sides of said one end sled section.

8. The combination of claim 5 wherein said one end sled section comprises the front section, the forward ends of the runner members of said front section curving upwardly.

* * * * *